(12) United States Patent
Kennedy et al.

(10) Patent No.: US 8,371,071 B2
(45) Date of Patent: Feb. 12, 2013

(54) STEPPED STRUCTURE

(75) Inventors: Stephen John Kennedy, Ottawa (CA); Neil Little, Chalfont St. Giles (GB)

(73) Assignee: Intelligent Engineering (Bahamas) Limited, Nassau (BS)

( * ) Notice: Subject to any disclaimer, the term of this patent is extended or adjusted under 35 U.S.C. 154(b) by 0 days.

(21) Appl. No.: 13/063,565

(22) PCT Filed: Sep. 7, 2009

(86) PCT No.: PCT/GB2009/002138
§ 371 (c)(1),
(2), (4) Date: Apr. 21, 2011

(87) PCT Pub. No.: WO2010/029286
PCT Pub. Date: Mar. 18, 2010

(65) Prior Publication Data
US 2011/0225906 A1   Sep. 22, 2011

(30) Foreign Application Priority Data
Sep. 12, 2008 (GB) .................................. 0816774.4

(51) Int. Cl.
*E04H 3/10* (2006.01)
*E04H 3/26* (2006.01)
*E04H 3/12* (2006.01)

(52) U.S. Cl. .......................................... 52/8; 52/6; 52/7
(58) Field of Classification Search ................. 52/6–8
See application file for complete search history.

(56) References Cited

U.S. PATENT DOCUMENTS

| 1,452,467 A | * | 4/1923 | Lambert ............................ 52/8 |
| 5,014,475 A | * | 5/1991 | Anderson et al. ............... 52/191 |
| 2004/0010981 A1 | | 1/2004 | Kennedy |
| 2006/0150540 A1 | | 7/2006 | Kennedy |

FOREIGN PATENT DOCUMENTS

| GB | 2 368 041 | 4/2002 |
| WO | WO 2005/001218 | 1/2005 |

OTHER PUBLICATIONS

International Search Report for PCT/GB2009/002138, mailed Dec. 11, 2009.
Written Opinion of the International Searching Authority for PCT/GB2009/002138, mailed Dec. 11, 2009.
UK Search Report for GB0816774.4, dated Jan. 21, 2009.

\* cited by examiner

*Primary Examiner* — Mark Wendell
(74) *Attorney, Agent, or Firm* — Nixon & Vanderhye P.C.

(57) ABSTRACT

A stepped structure (100) comprising a plurality of separate run portions (1), wherein at least one of said plurality of separate run portions (1) comprises upper and lower sheets (20) each sheet having a forward longitudinal end portion (14, 24) bent downwards and a rear longitudinal end portion (12, 22) bent upwards, and a core material (30) between said upper and lower sheets (10, 20).

21 Claims, 4 Drawing Sheets

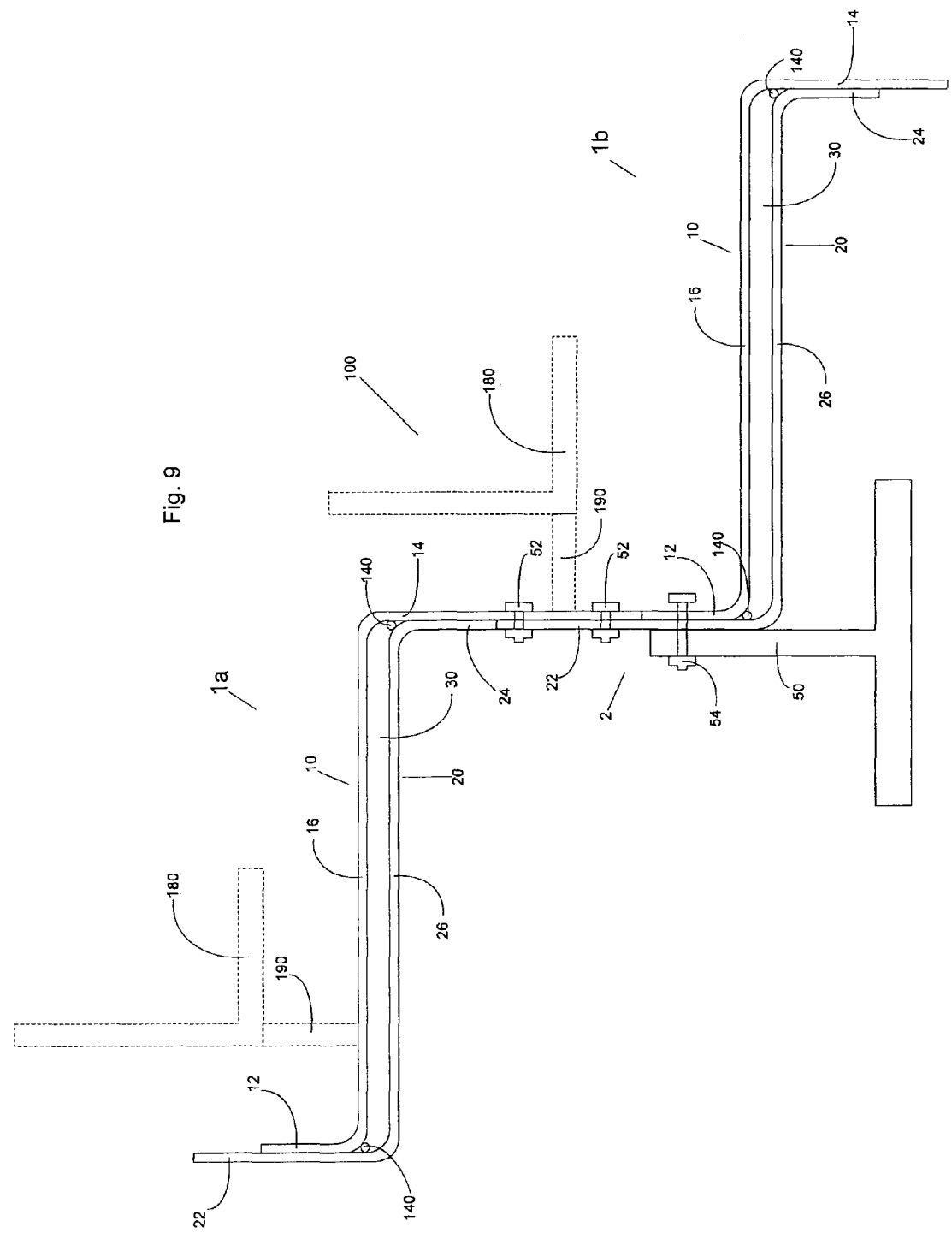

STEPPED STRUCTURE

This application is the U.S. national phase of International Application No. PCT/GB2009/002138, filed 7 Sep. 2009, which designated the U.S. and claims priority to GB Application No. 0816774.4, filed 12 Sep. 2008, the entire contents of each of which are hereby incorporated by reference.

The present invention relates to a stepped structure such as a stepped riser, perhaps a seating riser e.g. for a sports stadium or other entertainment venue.

To increase the revenue from sporting and other events, it is desirable to maximize the number of spectators that can be accommodated in a sports stadium or other venue. To do this it is necessary to provide additional tiers of seats, often resulting in structures in which a significant portion of the upper bowl seating cantilevers over other parts of the structure. Accordingly, the weight of risers supporting such seating should be minimized to reduce the size and cost of the supporting structure. To reduce transient and resonating vibrations associated with sporting and entertainment events the risers must be stiff, have sufficient mass, or be constructed with materials having good damping characteristics. Existing designs of seating risers are made of prestressed or precast concrete or steel. Known riser sections are generally constructed from concrete as it allows for long clear spans between rakers (typically 12,200 mm) with reasonable vibration control since concrete has a damping coefficient of 0.2, good fire resistance and relatively low maintenance cost. The major disadvantage of concrete construction is that the riser section is heavy, e.g. about 10 T for a two tier riser, with self weight (deadload) equal to the design superimposed live load due to use and occupancy. It is therefore necessary to provide heavier, stronger, stiffer and more costly superstructure and foundations to support the riser sections, especially for large cantilever seating sections.

To minimise self weight, and hence reduce the cost of the superstructure and foundations, the riser sections may be constructed with folded steel plates that are supported by intermediate rakers and a secondary steel framework. Typically the maximum span for this type of construction is approximately 6100 mm and the self weight about 40% of an equivalent concrete structure. However, steel risers are more susceptible to sound and vibration problems, having a damping coefficient of 0.1, and have additional costs associated with the fabrication and erection of the intermediate rakers and secondary steel framework.

Structural sandwich plate members are described in U.S. Pat. No. 5,778,813 and U.S. Pat. No. 6,050,208, which documents are hereby incorporated by reference, and comprise outer metal, e.g. steel, plates bonded together with an intermediate elastomer core, e.g. of unfoamed polyurethane. These sandwich plate systems (often referred to as SPS structures) may be used in many forms of construction to replace stiffened steel plates, formed steel plates, reinforced concrete or composite steel-concrete structures and greatly simplify the resultant structures, improving strength and structural performance (e.g. stiffness, damping characteristics) while saving weight. Further developments of these structural sandwich plate members are described in WO 01/32414, also incorporated hereby by reference. As described therein, foam forms or inserts may be incorporated in the core layer to reduce cost and/or weight and transverse metal shear plates may be added to improve stiffness.

According to the teachings of WO 01/32414 the foam forms can be either hollow or solid. Hollow forms generate a greater weight reduction and are therefore advantageous. The forms described in that document are not confined to being made of light weight foam material and can also be make of other materials such as wood or steel boxes, plastic extruded shapes and hollow plastic spheres.

GB 2,368,041 discloses a stepped riser comprising a sandwich structure having upper and lower metal plates and an intermediate layer of plastics or polymer materials bonded to the metal plates so as to transfer shear forces therebetween i.e. a SPS structure. The plates are pre bent into the desired stepped riser shape and welded together and then the intermediate layer is injected into the stepped riser shaped cavity between the two plates. The sandwich structure plates used in forming the stepped riser have increased stiffness as compared to steel plates of comparable thickness and avoid or reduce the need to provide stiffening elements. This results in a considerably simpler structure with fewer welds leading to both simplified manufacture and a reduction in the area vulnerable to fatigue or corrosion. However, the structure into which the elastomer is injected is bulky and complicated to assemble.

One aim of the present invention is to provide an improved structural member.

The present invention provides a stepped structure comprising a plurality of separate run portions, wherein at least one of said plurality of separate run portions comprises upper and lower sheets each sheet having a forward longitudinal end portion bent downwards and a rear longitudinal end portion bent upwards, and a core between said upper and lower sheets.

This significantly simplifies production of a stepped riser and assembly. Furthermore, the stepped structure can be made with only bends of approximately 90° (e.g. 90.6°) thereby allowing the stepped structure to be made without specialised bending equipment. The upper and lower sheets may be identical in profile so that a single sheet bending line may be used to fabricate both sheets. Furthermore, the number of welds needed to manufacture a stepped structure (optionally with the sandwich plate system (SPS)) is kept low. This not only reduces the cost of welding but also eliminates a potentially fatigue prone detail. Also, the present design thereby avoids greater potential for welding distortion. Furthermore, the individual elements from which the stepped structure is made relatively are easily transportable and a plurality of separate run portions can be stacked. Fixing together of the separate run portions and fixing to a frame work is also simplified. The separate run portions can be fabricated at a manufacturing plant and transported to the site for assembly.

The materials, dimensions and general properties of the sheets of metal and core of the invention may be chosen as desired for the particular use to which the stepped riser is to be put. In general they may be as described in U.S. Pat. No. 5,778,813 and U.S. Pat. No. 6,050,208 for the case that the core is of a polymer or plastics material. Steel or stainless steel is commonly used in thicknesses of 0.5 to 20 mm (preferably 3-5 mm) and aluminium may be used where light weight is desirable. Similarly, the core may be a plastics or polymer material which is preferably compact (i.e. not foamed) and may be any suitable material, for example an elastomer such as polyurethane, as described in U.S. Pat. No. 5,778,813 and U.S. Pat. No. 6,050,208. Lightweight forms or inserts may also be included as described in WO 01/32414. The first sheet of metal may be painted or have a different surface treatment applied to improve traction.

A stepped structure according to the present invention can be designed to meet relevant serviceability criteria and construction constraints related to vibration and deflection control, and plate handling. The resulting structure is light, stiff and, with the plastics or polymer material's inherent dampening characteristics, provides improved structural and vibration response performance over risers built with stiffened steel plates and rolled sections (secondary steel work) or those built with prestressed concrete.

The present invention will be described further below with reference to the following description of an exemplary embodiment and the accompanying schematic drawings, in which:

FIG. 9 illustrates, in cross-section in the transverse direction, a further embodiment of stepped structure comprising two separate run portions.

FIRST EMBODIMENT

Figure 1:
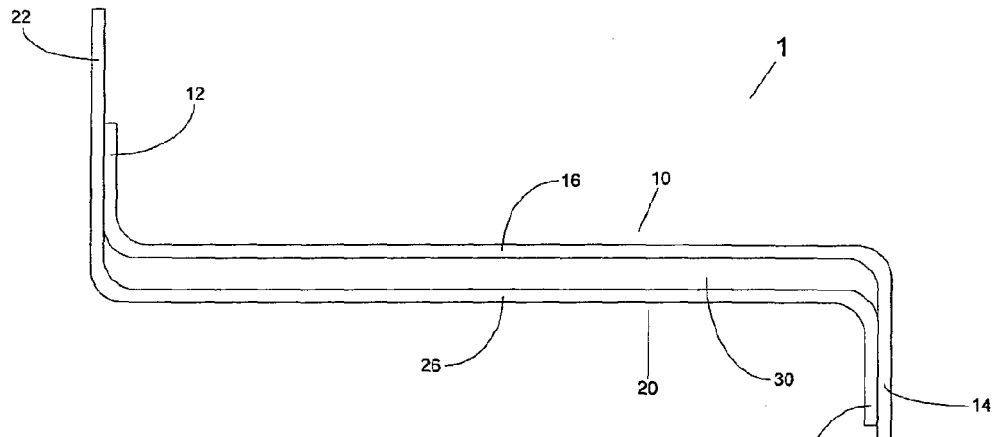
FIG. 1 illustrates, in cross-section in the transverse direction, a separate run portion according to a first embodiment of the present invention.

FIG. 1 shows a cross-section in the transverse direction through a separate run portion 1 according to the present invention. The separate run portion 1 can be used for forming a stepped structure 100 (see FIG. 2), for example a seating riser for use in a theatre or small stadium etc.

Typically a section of seating has a width of between 5 and 15 metres and is supported at each end by raker beams which can cantilever over other parts of the stadium. Seats are then placed on run portions 1 of the stepped structure. The run portions 1 are generally horizontal and steps between the run portions 1 are termed rise portions 2 which are generally vertical. The stepped structure can be assembled on site or can be pre-assembled partially or completely.

As can be seen from FIG. 1 in the structural element the separate run portion 1 (which is elongate in the longitudinal direction) is made of an upper sheet 10 and a lower sheet 20. The upper and lower sheets 10, 20 are comprised of first and second metal plates, preferably steel plates though other materials may be suitable. For example, the sheets 10, 20 may be made of a fibre reinforced plastic or be made of a metal other than steel, for example aluminium.

The thickness of the upper and lower sheets 10, 20 may be, for example, in the range of from 0.5 to 20 mm. Parts of the structure expected to experience wear in use may be formed with thick metal layers and/or surface profiling, e.g. to improve grip. Alternatively coatings may be used.

Between the upper and lower sheets 10, 20 is a core 30. The core 30 is preferably of plastics or polymer material, preferably a compact thermosetting material such as polyurethane elastomer, so as to form a structural plate member (SPS) which acts as the run portion or the tread of the structural member. The core 30 may be a concrete layer. The concrete layer may be normal concrete which typically weighs about 2400 kg/m$^3$ (e.g. between 2100 and 2700 kg/m$^3$), but preferably light weight concrete which typically weighs about 1900 kg/m$^3$ (e.g. between 1200 and 2200 kg/m$^3$), more preferably ultra light weight concrete that typically weighs about 1200 kg/m$^3$ or less (e.g. between 500 and 1200 kg/m$^3$). The concrete may be of any type of cementitious material (e.g. cements such as Portland cement, fly ash, ground granulated blast furnace slags, limestone fines and silica fume). The core 30 is formed of a material which transfers shear forces between the upper and lower sheets 10, 20. The core 3 may have a thickness in the range of from 15 to 300 mm (preferably 15-30 mm, e.g. 20 mm) and is bonded to the upper and lower sheets 10, 20 with sufficient strength and has sufficient mechanical properties to transfer shear forces expected in use between those sheets 10, 20. The bond strength between the core 30 and the sheets 10, 20 should be greater than 3 MPa, preferably 6 MPa, and the modulus of elasticity of the core material should be greater than 200 MPa, preferably greater than 250 MPa, especially if expected to be exposed to high temperatures in use.

For low load applications, such as staircase risers, where the typical use and occupancy loads are of the order of 1.4 kPa to 7.2 kPa, the bond strength may be lower, e.g. approximately 0.5 MPa. By virtue of the core layer 30, the structural sandwich plate member has a strength and load bearing capacity of a stiffened steel plate having a substantially greater plate thickness and significant additional stiffening.

To manufacture the structural member, the inner surfaces of sheets 10, 20 are prepared, e.g. by acid etching and cleaning and/or grit blasting or any other suitable method, so that the surfaces are sufficiently clean to form a good bond to the core material.

The core material is preferably injected or vacuum filled into a cavity and then allowed to cure in the cavity. In order to manufacture the separate run portion 1 in this way, a cavity is formed between the sheets 10, 20 by sealing longitudinal ends of the structural plate member (as is described below) and transverse edges of the structural plate member (for example by welding a face plate between the upper and lower sheets 10, 20 or by placing or welding an edge bar 60 (see FIG. 6) between the upper and lower sheets 10, 20 at their transverse edges). Thus, a core cavity is formed between the upper and lower sheets 10, 20 and core material can be injected into the core cavity by injection ports (not shown) either in the plates or the member attached at the transverse ends. Vent holes can be provided in any convenient position. Both vent holes and injection ports are preferably filled and ground flush after injection is completed. During injection and curing of the core material, the sheets 10, 20 may need to be restrained to prevent buckling due to thermal expansion of the core caused by the heat of curing. Alternatively, especially for relatively small risers, the structural member may be put into a mould for injection of the core material. In fact, due to the geometry of the rise portion(s) 2 of the present invention and which are described below, buckling of the upper and lower sheets 10, 20 during injection and curing of the core material is unlikely and this is a further advantage of the present invention.

Although not shown, spacers, light weight forms, shear plates and other inserts may be positioned in the core cavity before the upper and lower sheets 10, 20 are fixed in place.

Spacers are advantageous because they ensure that the spacing of the sections, and hence the core thickness, is uniform across the riser. Furthermore, other low density bulking materials may be used in the core material such as micro spheres and these help in keeping the weight of the structural member low and cost down. Detailing, such as seat and safety rail mounts may be welded or otherwise fixed onto the structural member as desired before injection or after curing of the core. In the latter case however, care must be taken to avoid damage to the core.

FIG. 1 illustrates that the upper sheet 10 and lower sheet 20 of the separate run portion are bent at their longitudinal ends. That is, the upper and lower sheets 10, 20 are formed of three portions. These are a rear longitudinal end portion 12, 22, a forward longitudinal end portion 14, 24 and a central portion 16, 26. The central portion 16, 26 is positioned between the rear longitudinal end portion 12, 22 and the forward longitudinal end portion 14, 24.

The core 30 is generally only present between the upper and lower sheets 10, adjacent to the central portion 16, 26. That is, the core 30 does not extend all the way along the transverse direction of the sheets 10, 20 (though there may be some plastics or polymer material between the rear longitudinal end portions 12, 22 and/or the forward longitudinal end portions 14, 24 due to imperfect sealing between those two portions, as described below). The core 30 does not extend from one run portion 1 to another. That is, there is a break in the core 30 between adjacent separate run portions 1, e.g. the core 30 is not continuous throughout the structure. Put another way, the core 30 is not continuous through the stepped structure. At least part of a or each rise portion 2 of the stepped structure does not comprise a core (of plastics or polymer (load bearing) material). The rise portion 2 is substantially core free and is substantially comprised of only plates, for example metal plates. The plates may be the rear longitudinal end portions 12, 22 and forward longitudinal end portions 14, 24. The rear and forward longitudinal end portions 12, 22, 14, 24 may have no core between them. In particular no core exists between rear longitudinal end portions 12, 22 and forward longitudinal end portions 14, 24 of adjacent run portions. A central portion of the rise portion 2 is core free.

As can be seen in FIG. 1, the rear longitudinal end portions 12, 22 are generally perpendicular to the central portions 16, 26. Similarly, the forward longitudinal end portions 14, 24 are generally perpendicular to the central portions 16, 26. The angles may not be exactly 90°, for example to allow the run portion 1a slope of 1:100 downwards so that it can drain. The forward longitudinal end portions 14, 24 are bent downwards from the central portions 16, 26. The rear longitudinal end portions 12, 22 are bent upwards from the central portions 16, 26. The term "bent" does not necessarily mean that the sheet is formed into that shape by bending (though this may be the case, particularly if the sheets are made of metal), but it is used to indicate that the sheets are unitary (i.e. not formed by welding three plates together, for example). Therefore, if the sheets 10, 20 are made from fibre reinforced plastic, for example, the sheets may originally be formed in the shape illustrated in FIG. 1 and no actual physical bending may take place even though the end portions are bent upwards and downwards.

FIG. 1 illustrates a separate run portion 1. What is meant by the term "separate" is that the run portion is detached from other run portions and other components of the stepped structure. In particular, neither the upper sheet 10 nor the lower sheet 20 is used to form parts of a further run portion.

The rear longitudinal end portion 12 of the upper sheet 10 is substantially parallel to the rear longitudinal end portion 22 of the lower sheet 20. Both rear longitudinal end portions 12, 22 overlap. That is, a line which is perpendicular to the plane of both rear longitudinal end portions 12, 22 will pass through both rear longitudinal end portions 12, 22. The same is true for the forward longitudinal end portions 14, 24.

The forward longitudinal end portions 14, 24 and rear longitudinal end portions 12, 22 are present for two main reasons. First those parts of the sheets 10, are used to seal a cavity between the central portions 16, 26 of the upper and lower sheets 10, 20 which is then filled with core material 30. In that case the core 30 may be injected into the cavity. However, this is not necessarily the case and a pre-cast slab of core could be adhered to the inner surfaces of the central portions 16, 26 of the upper and lower sheets 10, 20. Second, the rear longitudinal end portions 12, 22 and forward longitudinal end portions 14, 24 can be used for fastening the separate run portion 1 to an adjacent separate run portion 1. This can be done by using fasteners, for example screw fasteners or rivets. Alternatively this could be done by welding.

Figure 3:
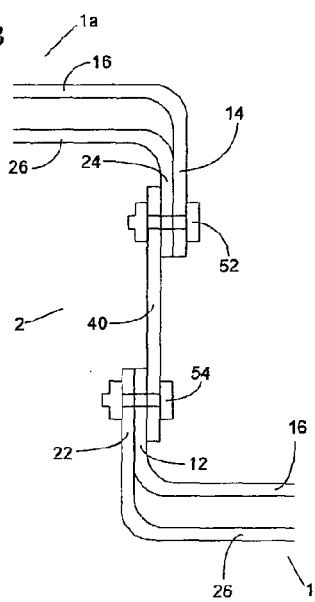
FIG. 3 illustrates, in cross-section in the transverse direction, a second embodiment of separate run portion and the way in which it is connected to an adjacent separate run portion.
Figure 2:
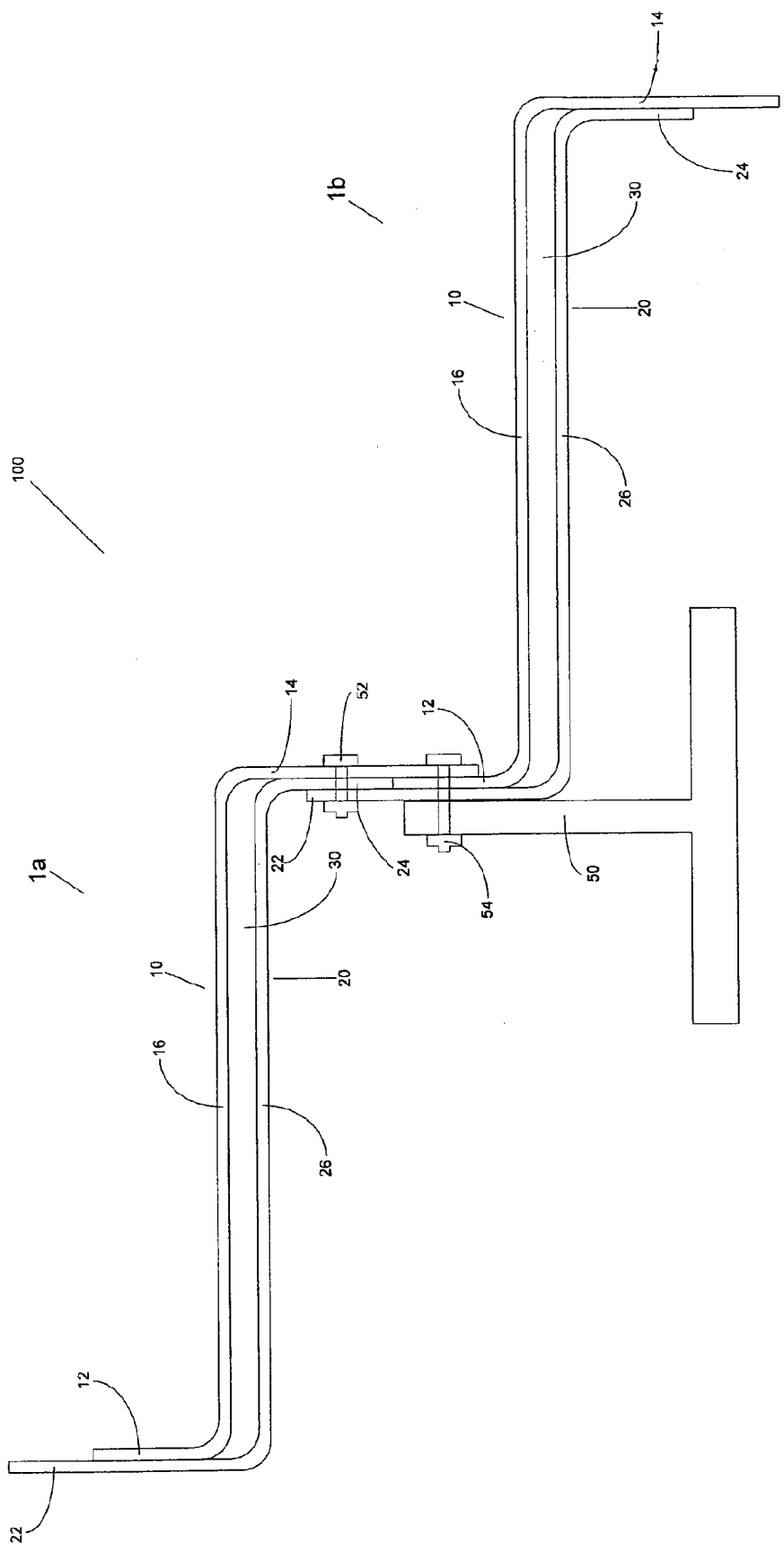
FIG. 2 illustrates, in cross-section in the transverse direction, a stepped structure according to the present invention comprising two separate run portions as illustrated in FIG. 1.

Two embodiments are illustrated in FIGS. 2 and 3 as to how adjacent separate run portions 1 could be attached, though there are other ways in which this can be achieved. In this way the forward longitudinal end portions 14, 24 and rear longitudinal end portions 12, 22 form at least part of the rise portion 2 between adjacent separate run portions 1.

Figure 4:
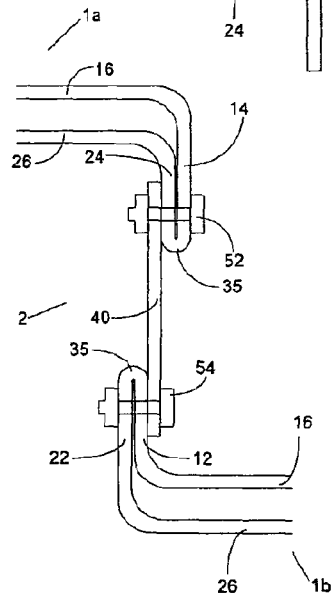
FIG. 4 illustrates, in cross-section in the transverse direction, a third embodiment of separate run portion and the way in which it is connected to an adjacent separate run portion.
Figure 5:
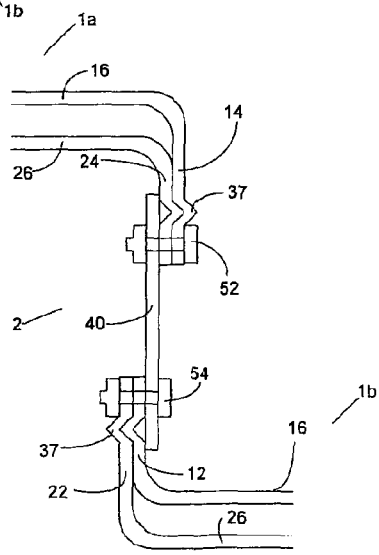
FIG. 5 illustrates, in cross-section in the transverse direction, a fourth embodiment of separate run portion and the way in which it is connected to an adjacent separate run portion.

As indicated above, a cavity is formed between the upper sheet 10 and lower sheet 20 which is substantially sealed from outside. At the longitudinal ends this is done by sealing between the rear longitudinal end portions 12, 22 and by sealing between the forward longitudinal end portions 14, 24. FIG. 1 illustrates one way in which this sealing is accomplished. Other ways in which the sealing may be accomplished are illustrated in FIGS. 4, 5 and 9.

In the embodiment of FIGS. 1 and 2 (as well as that of FIG. 3) the sealing is achieved by contact between the longitudinal end portions 12, 22, 14, 24. That is, the inner surfaces of the rear longitudinal end portions 12, 22 touch and the inner surfaces of the forward longitudinal end portions 14, 24 touch. By clamping the rear longitudinal end portions together and by clamping the forward longitudinal end portions 14, 24 together, the sealing can be achieved. In the case where the core material 30 is injected on site, the clamping can be achieved by first assembling the stepped structure as illustrated in FIG. 2, prior to injecting. Optionally a weld may be made between longitudinal end portions 12, 22 and 14, 24, in particular in the embodiments of FIGS. 1, 2, 3 and 5. The welds may be made prior to injecting the core or after injecting the core. It is easiest if the two longitudinal end portions 12, 22 and 14, 24 are made different lengths so that a fillet weld may be used.

As can be seen, in FIG. 1, both the upper sheet 10 and lower sheet 20 have the same shape. That is, the lower sheet 20 is simply an upper sheet 10 turned the other way around. This has advantages in manufacture because then a single plate bending line may be used to fabricate both upper and lower sheets 10, 20. Furthermore, the fact that only bends of approximately 90° are necessary also means that manufacture is likely to be much simpler. Also, the sheets 10, 20 can be stacked and easily transported to the site for assembly.

FIG. 2 illustrates how a plurality of separate run portions 1 can be assembled to form a stepped structure 100. Adjacent separate run portions 1 are fastened together. The adjacent separate run portions are fastened directly together (contrary to the embodiments of FIGS. 3-5). Although in FIG. 2 the fastening together is illustrated by way of bolts 52, 54, other ways of fastening could be used. For example, fastening could be way of rivets or by way of at least one weld. However, it is preferred to avoid the use of welding where possible in order to reduce production costs and time, as well as eliminating associated distortions. All welds are not necessarily eliminated however, as the cavities between the upper and lower sheets 10, 20 need to be sealed at their transverse end portions. This is usually accompanied, as described above, by welding a face plate or an edge bar 60 between the upper and lower sheets 10, 20.

As can be seen in FIG. 2, the separate run portions 1 are fastened together via their longitudinal end portions 12, 14, 22, 24. That is, an upper or first separate run portion 1a is attached to a lower or second separate run portion 1b by connecting together at least one forward longitudinal end portion 14, 24 of the upper separate run portion 1a to at least one of the rear longitudinal end portions 12, 22 of the lower separate run portion 1b. In fact, the rear and forward longitudinal end portions are of different lengths so that an overlapping stepped joint can be formed between the upper separate run portion 1a and lower separate run portion 1b. In fact, at least one upper fastener 52 passes through both forward longitudinal end portions 14, 24 of the upper separate run portion 1a and only one rear longitudinal end portion 22 of the lower sheet 20 the lower separate run portion 1b. At least one lower fastener 54 passes through both rear longitudinal end portions 12, 22 of the lower separate run portion 1b and only one forward longitudinal end portion 14 of the upper sheet 10 of the upper separate run position 1a. However, the opposite could also work. In the approach illustrated in FIG. 2 however, the visible joint to the outside of the stepped structure is positioned close to the lower run portion 1b and this is preferred. Other attachment systems could be used.

The lower fastener 54 can conveniently be used to connect the stepped structure to a supporting beam 50. All holes for fasteners may be punched on the production line.

An intumescent material may be positioned between the inner surfaces of the rear longitudinal end portions 12, 22 and between the inner surfaces of the forward longitudinal end portions 14, 24. The use of an intumescent material can help seal off the cavity for the core 30 and can also help in fire prevention and in particular opening up or de-gassing of the cavity in fire situations.

The intumescent material may be on either side of the fasteners 52, 54. However, the intumescent material is preferably on the side of the fastener 52, 54 nearer to the core 30.

FIG. 3 shows a second embodiment which is the same as the first embodiment except as described below. In FIG. 3 the forward longitudinal end portions 14, 24 are the same length. Similarly, the rear longitudinal end portions 12, 22 also extend away from the central portions 16, 26 by the same amount as each other. However, instead of being joined to the longitudinal end portions of the adjacent separate run portions, the forward longitudinal end portions 14, 24 of the upper separate run portion 1a are attached to the top of a plate 40 and the rear longitudinal end portions 12, 22 of the lower separate run portion 1b are attached to the lower side of the same plate 40. Therefore, the plate can be seen as a rise plate 40. Therefore, the rise portion 2 is made up of the forward longitudinal end portions 14, 24, the plate 40 and the rear longitudinal end portions 12, 22.

The fastening arrangement is the same as in the first embodiment, namely by an upper fastener 52 passing through both the forward longitudinal end portions 14, 24 of the upper separate run portion 1a and the plate 40 and a separate lower fastener 54 passing through both of the rear longitudinal end portions 12, 22 of the lower separate run portion 1b and the plate 40.

The sealing between the forward longitudinal end portions and between the rear longitudinal end portions is the same as in the first embodiment.

FIG. 4 illustrates a third embodiment which is the same as the second embodiment except as described below. In FIG. 4 a single sheet makes up both the upper sheet 10 and the lower sheet 20. The sheet is bent over by 180° at a bent portion 35 which is at the end of the forward longitudinal end portions 14, 24 or the rear longitudinal end portions 12, 22 (both illustrated). In this embodiment only one of the longitudinal end portions can be sealed by the bent portion 35. The other of the longitudinal end portions will need to be sealed by a different method. It is expected that the use of an intumescent material between the longitudinal end portions will not be as effective for a downwardly facing joint as for an upwardly facing joint. Therefore it is preferred that the bent portion 35 is at the ends of the forward longitudinal end portions 14, 24 rather than at the ends of the rear longitudinal end portions 12, 22.

FIG. 5 shows a fourth embodiment. The FIG. 5 embodiment is the same as the FIG. 3 embodiment except as described below. However, in the FIG. 5 embodiment, the rear longitudinal end portions 12, 22 and the forward longitudinal end portions 14, 24 are crimped together using a crimp 37. This provides a better seal than simple bolting. The crimp may be on either side of the fasteners 32.

Any of the ways of sealing of the above embodiments can be used with any other way. For example the forward longitudinal and portions may be sealed by a bent portion 35 and the rear longitudinal and portions may be sealed by a crimp 37.

Figure 6:
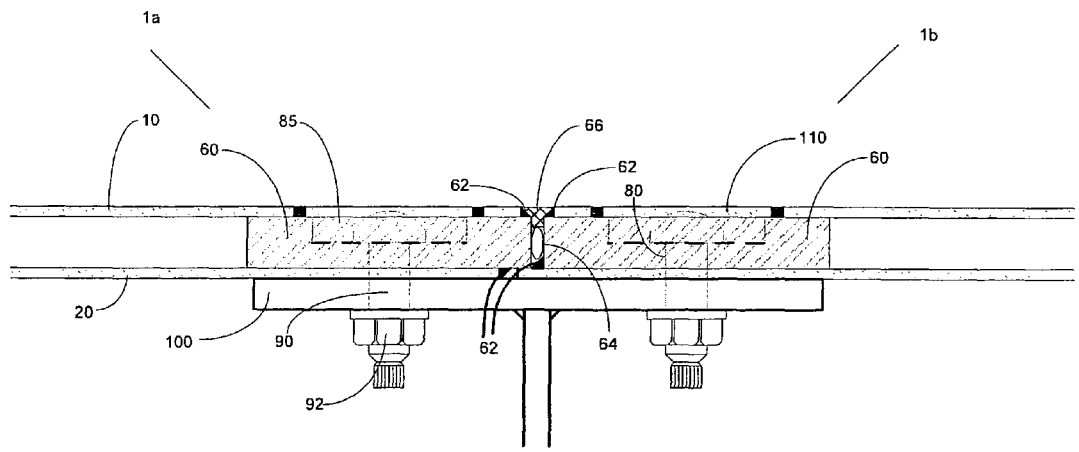
FIG. 6 illustrates, in cross-section in the longitudinal direction, a connection detail between two run portions of adjacent stepped structures.
Figure 7:
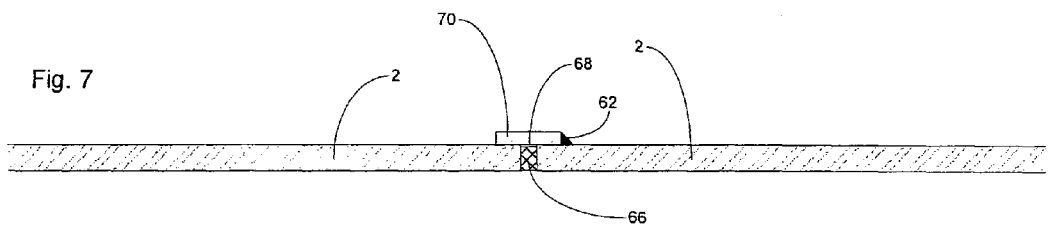
FIG. 7 illustrates, in cross-section in the longitudinal direction, a connection detail between two riser plates of adjacent stepped structures.
Figure 8:
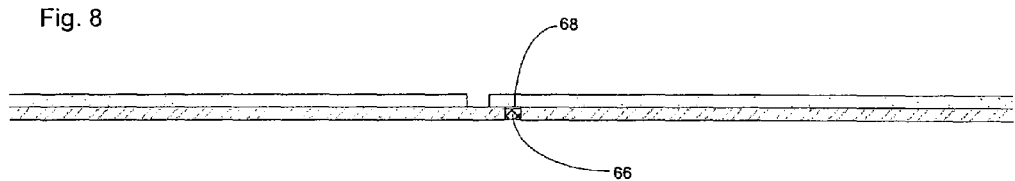
FIG. 8 illustrates, in cross-section in the longitudinal direction, a further embodiment of a connection detail between two riser plates of adjacent stepped structures.

FIGS. 6-8 illustrate how two stepped structures 100 may be joined together at their transverse ends (i.e. two stepped structures which are positioned next to each) other so that a run portion 1 of one stepped structure 100 is then continued by a run portion 1 of the other stepped structure.

FIG. 6 illustrates how two adjacent run portions may be joined and FIGS. 7 and 8 illustrate how two adjacent risers of different designs may be joined. In all cases, it is desirable to have a joint which is translatable thereby to be able to take up thermal expansions and contractions.

As is illustrated in FIG. 6, an edge bar 60 has been welded in place (using welds 62) between the upper and lower sheets 10, 20 along the transverse ends. The forward upper end edge and rear lower end edge of the edge bar may be machined in order that they fit into the curve of the bend of the upper and lower sheets 10, 20. The machining may be a simple 45° cut. The lower sheet 20 of the left hand run portion 1a is shorter in the transverse direction than the upper sheet 10. The outer end of the edge bar 60 is substantially level with the outer end of the upper sheet 10 (albeit leaving enough space for the weld 62). Therefore the edge bar 60 at its bottom outer edge provides a landing surface for the bottom sheet 20 of the adjacent run portion. In the adjacent run portion 1b the lower sheet 20 protrudes further than the upper sheet 10 and the edge bar 60 has its outer end substantially co-plannar with the outer edge of the upper sheet 10 (albeit allowing for the weld 62). Using this configuration the inner surface of the lower sheet 20 of the adjacent run portion 16 engages with the outer bottom surface of the edge bar 60 of the left hand run portion 1a. Sealing between the two run portions 1a, 1b can be done by the provision of a tube or rod 64 positioned between the two edge bars 60. The tube or rod can be of silicone or other non-absorbent material. Placed on top of the rod or tube 64 is a fire resistant barrier 66. The fire resistant barrier 66 can be applied in the form of a gel, for example, which then sets. This arrangement can provide both sealing properties as well as fire resistant properties.

FIG. 6 also illustrates how the assembly may be attached to a frame 100. Through holes 80 are machined through the edge bar 60 and upper and lower sheets 10, 20. A recess 85 for the head of a bolt 90 is also present in the top of the edge bar 60. After a bolt 90 has been placed in the through hole 80 and attached to a frame 100 with a nut 92, a cover plate 110 may be welded in place over the recess 85 so that the upper sheet 10 and cover plate 110 provide a continuous flat top surface.

For the sealing of adjacent rise portions, an overlap also needs to be engineered. In the case of FIG. 7, each run portion 2 is comprised of a single plate. Therefore a backing bar 70 is welded to one of the plates so that an overlap between the two rise portions is present. The gap between the two rise plates 2 can then be filled with fire resistant sealant 66 as in the FIG. 6 embodiment. However, in order to avoid adherence of the material 66 to the backing plate 70, a bond breaker 68 is adhered to the backing plate 70 prior to filling in of the material 66.

In the FIG. 8 embodiment each riser is made of two plates. By making the edges of the plates different lengths, adjacent risers can be arranged to overlap. The same filling procedure with bond breaker can then be applied as in the FIG. 7 embodiment.

FIG. 9 illustrates a further embodiment as to how adjacent separate run portions 1 could be attached. The embodiments of FIG. 9 is the same as the embodiment of FIG. 2 except as described below.

In FIG. 9, the forward longitudinal end portion 14 of the upper sheet 10 is brought into contact with the rear longitudinal end portion 22 of the lower sheet 20 of the adjacent separate run portion 1. Therefore bolts 52 can pass through only two plates and the run portion 2 is only two plates thick.

Additionally illustrated in FIG. 9 is a further way in which the cavity is substantially sealed from outside. A gasket 140 may be positioned between rear longitudinal end portions 12, 22 and/or forward longitudinal end portions 14, 24 of a single separate run portion 1. After positioning of the gaskets 140 in place, the core 3 may be injected into the cavity formed between the upper and lower plates 10, 20. In some circumstances it may be acceptable to have no further sealing (for example in indoor arenas or where the stepped structure is in a low stress situation). Alternatively after injection of the core 3 the upper and lower sheets 10, 20 may be welded together at their longitudinal end portions 12, 22, 14, 24. Such a welded structure has improved stress performance and water tightness.

Additionally illustrated in FIG. 9 are two possible positions of seat 180 which may be mounted on the stepped structure. As can be seen seats 180 may be fastened to the stepped structure through one or more brackets 190. The brackets 190 may be attached to either a run portion 1 or a rise portion 2. In this way a stepped structure according to the present invention can be used to provide tiered seating, for example in a sports stadium, a stadium of another kind, an arena, a theatre etc.

Materials

If the sheets 10, 20 are made of metal and other metal parts of the structural member described above, are preferably made of structural steel, as mentioned above, though these may also be made with aluminium, stainless steel, galvanised steel or other structural alloys in applications where lightness, corrosion resistance or other specific properties are essential. The metal should preferably have a minimum yield strength of 240 MPa and an elongation of at least 10%.

The core material should have, once cured, a modulus of elasticity, E, of at least 200 MPa, preferably 275 MPa, at the maximum expected temperature in the environment in which the member is to be used. In civil applications this may be as high as 60° C.

The ductility of the core material at the lowest operating temperature must be greater than that of the metal layers, which is about 20%. A preferred value for the ductility of the core material at lowest operating temperature is 50%. The thermal coefficient of the core material must also be sufficiently close to that of the steel so that temperature variation across the expected operating range, and during welding, does not cause delamination. The extent by which the thermal coefficients of the two materials can differ will depend in part on the elasticity of the core material but it is believed that the thermal expansion coefficient of the core material may be about 10 times that of the metal layers. The coefficient of thermal expansion may be controlled by the addition of fillers.

The bond strength between the core and sheets must be at least 0.5, preferably 6, MPa over the entire operating range. This is preferably achieved by the inherent adhesiveness of the core material to metal but additional bond agents may be provided.

The core material is preferably a polymer or plastics material such as a polyurethane elastomer and may essentially comprise a polyol (e.g. polyester or polyether) together with an isocyanate or a di-isocyanate, a chain extender and a filler. The filler is provided, as necessary, to reduce the thermal coefficient of the intermediate layer, reduce its cost and otherwise control the physical properties of the elastomer. Further additives, e.g. to alter mechanical properties or other characteristics (e.g. adhesion and water or oil resistance), and fire retardants may also be included.

Whilst an embodiment of the invention has been described above, it should be appreciated that this is illustrative and not intended to be limitative of the scope of the invention, as defined in the appended claims. In particular, the dimensions given are intended as guides and not to be prescriptive. Also, the present invention has been exemplified by description of a seating riser but it will be appreciated that the present invention is applicable to other forms of stepped structure.

The invention claimed is:

1. A stepped structure comprising a plurality of separate run portions, wherein said plurality of separate run portions each comprise upper and lower sheets each sheet having a forward longitudinal end portion bent downwards and a rear longitudinal end portion bent upwards, and wherein the upper an lower sheets are identical in profile, and a core between said upper and lower sheets, wherein a cavity between said upper and lower sheets of each separate run portion is substantially sealed from outside between said respective forward longitudinal end portion and said respective rear longitudinal end portion.

2. The stepped structure of claim 1, wherein adjacent separate run portions are fastened together.

3. The stepped structure of claim 2, wherein said fastening is by way of at least one fastener.

4. The stepped structure of claim 3, wherein said fastener comprises rivets and/or screw fasteners.

5. The stepped structure of claim 2, wherein said fastening is by way of at least one weld.

6. The stepped structure of claim 2, wherein adjacent separate run portions are fastened together via at least one of their respective longitudinal end portions.

7. The stepped structure of claim 2, wherein a forward longitudinal end portion of a run portion is attached to a rear longitudinal end portion of the adjacent run portion to form a rise portion, wherein no core of plastics or polymer material exists between the forward longitudinal end portion and the rear longitudinal end portion.

8. The stepped structure of claim 2, wherein said adjacent separate run portions are both fastened to a plate such that said adjacent separate run portions are fastened together with said plate forming at least part of a rise portion between said adjacent separate run portions.

9. The stepped structure of claim 2, wherein said adjacent separate run portions are fastened to each other by fastening said at least one rear longitudinal end portion of a first separate run portion of said adjacent separate run portions to at least one forward longitudinal end portion of a second separate run portion of said adjacent separate run portions such that said at least one rear longitudinal end portion and said at least one forward longitudinal end portion from a rise portion between said adjacent separate run portions.

10. The stepped structure of claim 2, wherein said adjacent separate run portions are fastened together by passing at least one fastener through at least one of said forward longitudinal end portions of a higher separate run portion of said adjacent separate run portions and at least one of said rear longitudinal end portion of a lower separate run portion of said adjacent separate run portions.

11. The stepped structure of claim 10, wherein said at least one fastener passes through both forward longitudinal end portions and/or both rear longitudinal end portions.

12. The stepped structure of claim 1, wherein said rear longitudinal end portions are parallel to each other and are both present in a direction perpendicular to their planes and/or said forward longitudinal end portions are parallel to each other and are both present in a direction perpendicular to their planes.

13. The stepped structure of claim 1, wherein at least part of a or the rise portion between adjacent run portions does not comprise a core.

14. The stepped structure of claim 1, wherein said end portions form at least part of rise portions between run portions.

15. The stepped structure of claim 1, wherein said cavity is sealed by contact between said longitudinal end portions, or wherein said cavity is substantially sealed from outside by a gasket positioned between said upper and lower sheets, or wherein said cavity is sealed by crimping together of end portions.

16. The stepped structure of claim 1, wherein said upper and lower sheets are formed from one unitary sheet bent by 180° at the edge of one of the rear and forward longitudinal end portions such that said respective end portions are sealed by the portion of said sheet bent by 180°.

17. The stepped structure of claim 1, wherein said upper and lower sheets are sealed by being clamped together.

18. The stepped structure of claim 1, further comprising an intumescent material positioned between at least one of said forward longitudinal end portions and said rear longitudinal end portions.

19. The stepped structure of claim 1, wherein the stepped structure is a tiered seating structure.

20. The stepped structure of claim 1, wherein the core is of a polymer or plastics material.

21. The stepped structure of claim 1, wherein the core comprises a cementitious material.

* * * * *